United States Patent [19]

Fleenor

[11] 4,205,315

[45] May 27, 1980

[54] FLUID LEVEL MEASUREMENT APPARATUS FOR MOUNTING IN MANHOLES AND SIMILAR STRUCTURES

[75] Inventor: Richard P. Fleenor, Santa Cruz, Calif.

[73] Assignee: Manning Environmental Corp., Santa Cruz, Calif.

[21] Appl. No.: 11,403

[22] Filed: Feb. 12, 1979

[51] Int. Cl.² .................................................. G01S 9/24
[52] U.S. Cl. ..................................... 343/14; 343/12 R; 343/720
[58] Field of Search .................................. 343/12 R, 14

[56] References Cited

U.S. PATENT DOCUMENTS

| 3,727,897 | 4/1973 | Bennett | 343/12 R X |
| 4,044,353 | 8/1977 | Levy | 343/14 X |
| 4,044,355 | 8/1977 | Edvardsson | 343/14 |

Primary Examiner—T. H. Tubbesing

[57] ABSTRACT

An apparatus for automatically measuring a fluid level beneath a manhole or the like, including a depth gauge supported by a support bracket, having a seat, which clamps to the inner rim of a manhole. The depth gauge is of the reflected microwave type, including transmitting and receiving antennas which fit into the seat of the support bracket.

4 Claims, 11 Drawing Figures

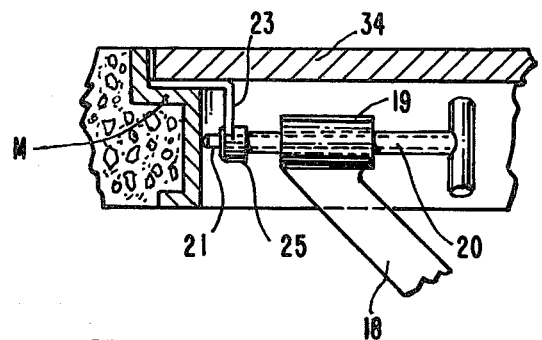
_Fig.3_
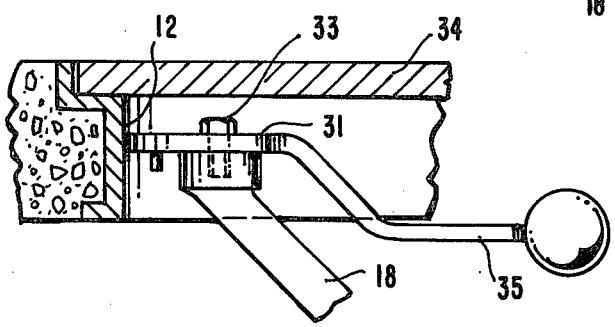
_Fig.4_
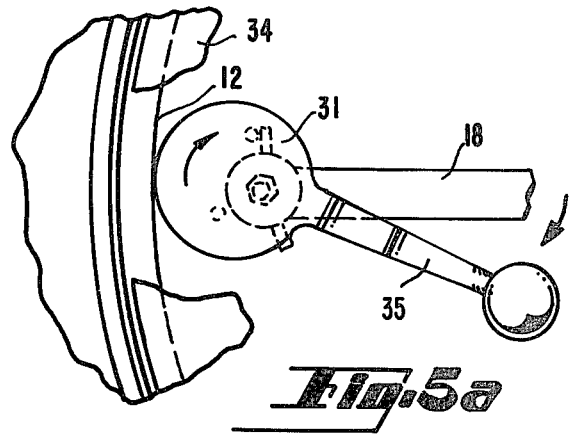
_Fig.5a_
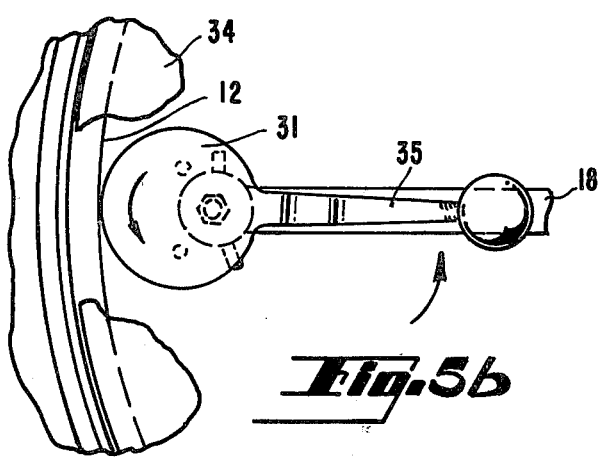
_Fig.5b_
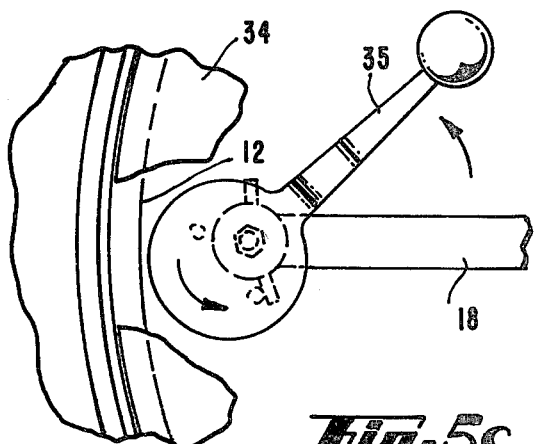
_Fig.5c_

FLUID LEVEL MEASUREMENT APPARATUS FOR MOUNTING IN MANHOLES AND SIMILAR STRUCTURES

BACKGROUND OF THE INVENTION a. Field of the Invention

This invention relates generally to distance gauges or range finder devices and more particularly to a microwave depth gauge adapted to be mounted in a manhole or the like.

b. Description of the Prior Art

One of the direct methods of determining the flow rate of sewage in open sewage lines of known capacity is to determine the height or level of sewage in an open pipe or flume of known dimensions. A direct method of measuring sewage level is to remove a manhole cover and lower a "bob" or float down to the sewage by means of a calibrated rope. When the bob reaches the surface of the sewage the rope slackens, indicating to the person taking the sewage level reading that the amount of rope already played out represents the distance between street level and the upper surface of the sewage. Since the ultimate depth of the sewage line is known, the person taking the measurement can calculate the depth and volume of the sewage.

A known device for measuring sewage levels includes an automated mechanism including a moisture sensor attached to the end of a reel of wire. Periodically, the mechanism unreels the wire until the moisture sensor signals that the upper surface of the sewage has been reached. At that moment, the mechanism records the number of feet of wire played out and reels the sensor back in.

Microwave gauges for use in measuring fluid levels in tanks are known. An example of such a device is found in the disclosure of K. Edvardsson in U.S. Pat. No. 4,044,355 which teaches the use of microwave radiation to measure the fluid contents of a tank or similar enclosure. Edvardsson's device radiates a microwave signal that varies linearly in frequency through a sweep period and which is reflected back to the device from the upper surface of the fluid. A mixer is used to mix the radiated microwave signal with the reflected microwave signal to produce a difference signal having a frequency that is proportional to the distance to the upper surface of the fluid. Compensating circuitry is included in Edvardsson's device to insure an averaging of the difference signal to eliminate transients caused by floating objects, wave action, wall reflections, etc.

A problem with sewage and fluid level measurement apparatus found in the prior art is that the cover of a sewage line manhole needs to be either removed or elevated so that the measurement apparatus may be positioned for use. Obviously, should the removal of a manole cover take place in a crowded thoroughfare, such as a street or sidewalk, traffic could be obstructed.

In U.S. Pat. No. 3,798,848 of B. Campagna a "support ring" is disclosed which attaches to the inner rim of a manhole to support venting valves below a manhole cover. Because sewage and fluid level measurement apparatus is usually bulky, special support structures are needed which allow replacement of the manhole cover while the measurement apparatus is supported in the upper rim of the manhole.

It is an object of this invention to provide an apparatus for measuring sewage levels that can be supported by the rim of a manhole in such a manner that the manhole cover can be removed and replaced without interference.

It is another object of this invention to provide such an apparatus which further utilizes reflected microwave energy to determine the sewage level.

SUMMARY OF THE INVENTION

The above objects have been met with a microwave depth gauge adapted for use in manholes. Briefly, the invention comprises a support bracket having a seat portion and a number of support arm portions extending upwardly from the seat portion to engage the inner rim of a manhole, and a depth gauge supported by the seat portion of the support bracket for determining the level of fluid below the gauge. The support arm portions are preferably joined together at a central hub to form a generally Y-shaped member having end sections bent upwardly out of plane with respect to the remainder of the support arm portions and having clamps disposed at their free ends for engaging the manhole rim.

The seat portion of the support is provided with a pair of space apart windows through which microwave energy can be transmitted and received. A pair of antennas is disposed in a microwave tranceiver housing to be aligned with the window. The transceiver housing is removably attached to the seat portion for ease of replacement.

An advantage of this invention is that the entire apparatus can be operably attached to the inner rim of the manhole in such a manner that the manhole cover can be removed and replaced without interference.

Another advantage is that the electronics portion of the depth gauge can be readily separated from the support bracket.

BRIEF DESCRIPTION OF THE DRAWINGS

FIG. 3 is a side cut away view of a clamping means for the apparatus shown in FIG. 1.

FIG. 4 is a side cut away view of an alternate clamping means for the appartus shown in FIG. 1

FIGS. 5a, 5b and 5c are top views illustrating the operation of the clamping means of FIG. 4.

FIG. 1a is a diagram illustrating the frequency shift between the radiated and received microwave signal in the transceiver of FIG. 6.

DESCRIPTION OF THE PREFERRED EMBODIMENT

Figure 1:
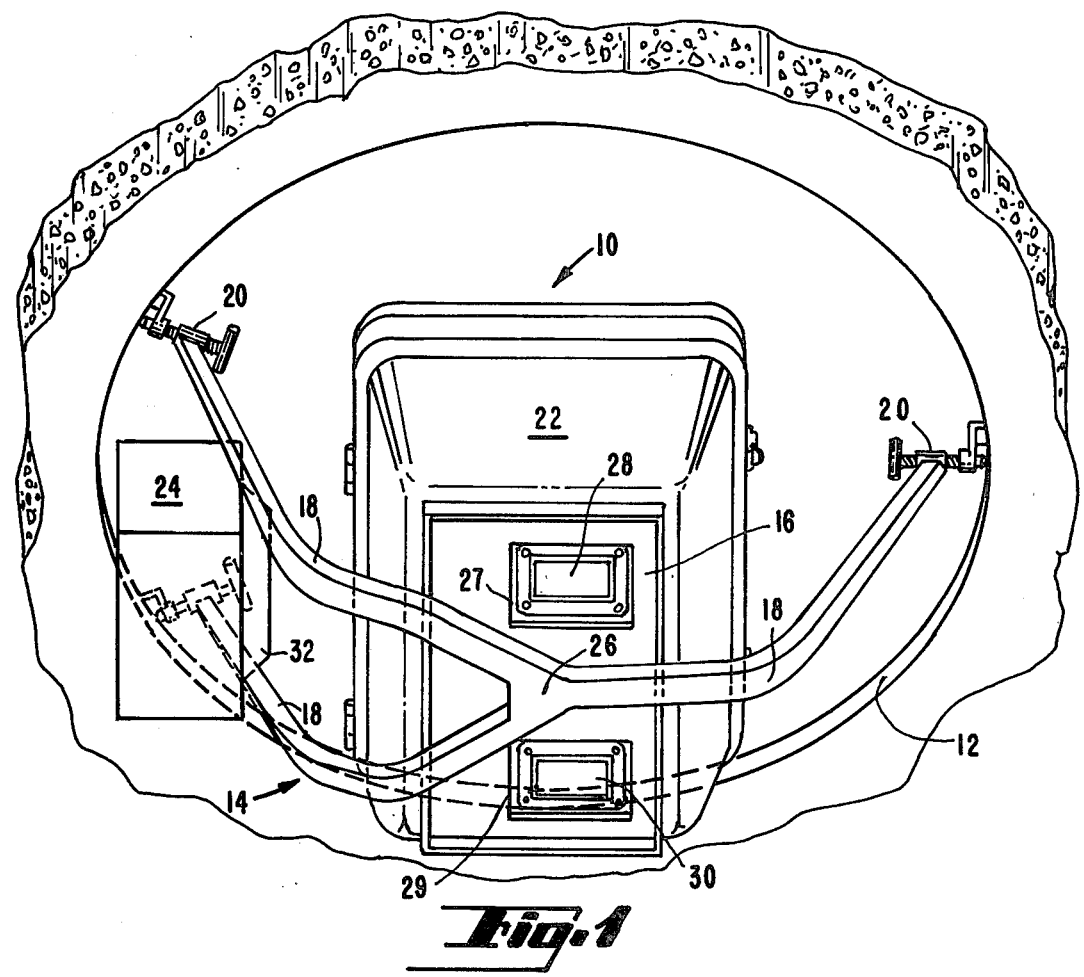
FIG. 1 is a perspective view of a sewage level measurement apparatus in accordance with the present invention clamped to the inner rim of a manhole.

In FIG. 1, a fluid level measurement apparatus 10 is shown to be clamped to the inner rim 12 of a manhole. The apparatus basically includes a support 14 that has a seat portion 16, a number of support arm portions 18 extending outwardly and upwardly from the seat portion and a number of clamping members 20 which can engage and disengage the support arm portions from inner rim 12. Also included in the apparatus is a depth gauge mounted in a depth gauge microwave transceiver enclosure 22 and a depth gauge power supply enclosure 24.

Enclosure 22 is mounted to bracket seat portion 16 by screws, or by straps, or both. Seat portion 16 has spaced apart receiving and transmitting windows, 27, 29, respectively. The electronics enclosure may be readily separated from the support bracket for replacement with a separate container, without the need to provide another support bracket.

Bracket seat portion 16 is generally rectangular framework configured to engage a portion of the base of enclosure 22. Support arm portions 18 are joined together at a central hub 26 to form a generally Y-shaped member having its end sections bent upwardly out of plane with respect to the remainder of the support arm portions. The seat portion is attached to at least one, but preferably all, of the support arm portions 18. The clamping means at the distal end of each support arm is adapted to engage a manhole as described below.

Preferably, the depth gauge is of the reflected microwave type which includes a transmitting antenna 28 and a receiving antenna 30 aligned with the spaced apart windows 27, 29 defined in the bottom of enclosure 22. It will be noted that the Y-shaped support arms are angled so as not to cover or interfere with the angle of microwave radiation. It will also be noted that the two closer support arm portions are spaced so as to provide a close fit for power supply enclosure 24, which is rigidly attached to the support arm portions by a bracket member 32.

Figure 2:
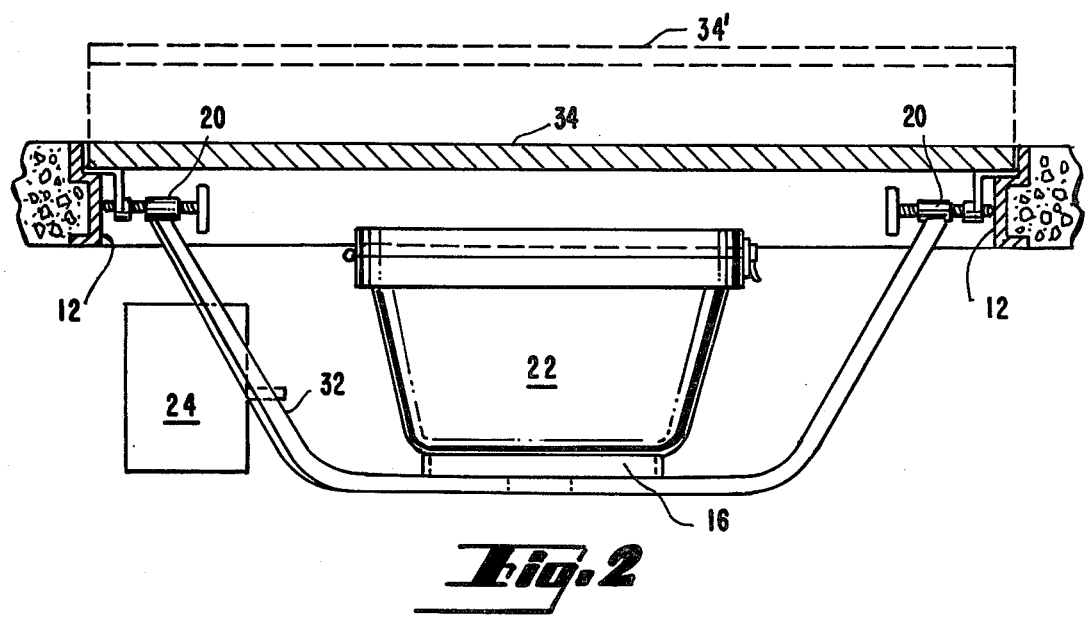
FIG. 2 is a side elevational view of the apparatus shown in FIG. 1.

In FIG. 2, a manhole cover 34 is shown in its usual position. For installation of the apparatus of the present invention the cover is removed from the manhole rim as shown by the dashed lines 34'. The support 14 is clamped to inner rim 12 of a manhole as described below. A microwave depth gauge transceiver enclosure 22 is then positioned on seat portion 16 so that microwave antennas 28 and 30 are unobstructed by support arm portions 18. Finally, the circuitry within enclosure 22 is connected to the power supply within enclosure 24 by means of a power cable, not shown. Manhole cover 34 can then be replaced over the manhole in an unobstructed manner.

In operation, a microwave signal is radiated from antenna 28 and its reflection from the upper surface of the sewage is received by antenna 30. Circuitry within enclosure 22 determines the distance that the microwave signal travelled and from that information computes the sewage level, as described below.

FIG. 3 illustrates a mechanism for clamping the apparatus of the present invention in a manhole. The support arm 18 terminates in an internally threaded sleeve 19 through which screw 20 passes. The forward end of screw 20 is a hardened point 21. Slightly back of point 21, approximately one centimeter back, is a cylindrical non-threaded screw portion 25 which passes through an L-shaped steel ledge hook 23. Ledge hook 23 is kept in place by one or more snap-on retainers. The top of ledge hook 23 is only a few millimeters thick so that it can reside over a manhole ledge M, but beneath a manhole cover 34. Screw 20 serves both to bring ledge hook 23 to a position close enough to the manhole wall to meet ledge M, as well as to make contact with the wall thereby securing the support arms. Screw 20 should be long enough to allow the support arms shown in FIG. 1 to be mounted in manholes of different sizes.

FIG. 4 shows an alternate construction for a clamping means for attaching the support apparatus of the present invention to the interior wall of a manhole. Support arm 18 carries a cam 31 which is mounted for rotation in a horizontal plane, parallel to the plane of manhole cover 34. Cam 31 is mounted to arm 18 by means of a bolt 33 which allows rotation of cam 31. Rotation is caused by cam arm 35 which is connected to cam 31 at the periphery of the cam. Cam 31 may preferably be circular, with bolt 33 mounted off center, so that the cam moves with an eccentric motion. The purpose of the cam 31 is to permit placement of the fluid level measurement apparatus of the present invention in manholes of different sizes.

Operation of the cam 31 may be seen in the top view of FIG. 5a wherein the cam 31 is rotated by cam arm 35 until firm contact is made between cam 31 and the inner rim 12 of the manhole. Cam 31 may be made of a material which may be compressed, similar to medium hard rubber and certain types of plastic materials.

In FIG. 5b, the cam 31 is seen to be rotated for maximum compression against inner wall 12. In other instances, it may not be necessary or desirable to extend cam 31 to its maximum compressive position. However, enough compression should be used to allow the measuring apparatus of the present invention to remain secure in a manhole.

FIG. 5c shows continued rotation of cam 31 by support arm 35 in the direction of arrow A releasing the support arm from inner wall 12.

Since the purpose of the cam 31 is to enable the measuring apparatus of the present invention to be securely mounted within a manhole, there may be instances where a set of cams mounted on all three of the arms shown in FIG. 1 may be too small to reach the manhole rim. In this situation, the cams may be removed by unscrewing the bolt 33 and a set of larger cams may be substituted so that the apparatus can be securely mounted in the manhole. It is not necessary to have cams on all of the support arms. Two of the support arms may have disk-shaped members, axially mounted to a support arm, for engagement with the rim of a manhole. The third support arm has an eccentric cam of the type shown in FIG. 4. In other instances, it may be desirable to use three cams for mounting the measurement apparatus of the present invention in manholes having a greater range of diameters.

Figure 6:
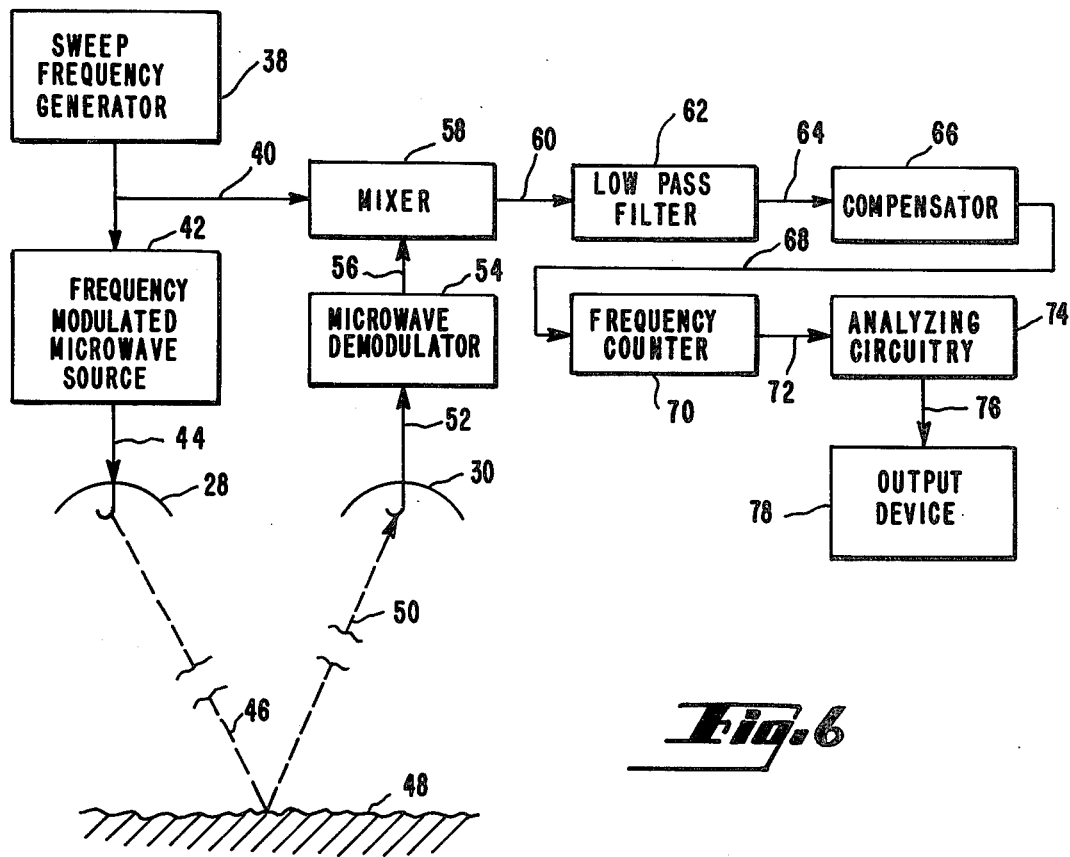
FIG. 6 is a block diagram of a circuit for a depth gauge microwave transceiver for use in the apparatus of FIG. 1.

In FIG. 6 a microwave transceiver depth gauge circuit is shown which is of a known type, similar to that described in Edvardsson's patent, supra. The transceiver includes a sweep frequency generator 38 for producing a sweep signal on a line 40. The sweep signal modulates the output of a microwave source 42 to produce a frequency modulated microwave signal on a line 44 for radiation by antenna 28. A radiated signal 46 is reflected by the upper surface of the fluid body 48 to produce a reflected signal 50 receivable by antenna 30 which develops a reflected microwave signal on a line 52. A microwave demodulator 54 inputs the signal on line 52 to develop a demodulated signal on a line 56.

A mixer 58 mixes the sweep signal on line 40 with the demodulated signal on line 56 to produce a sum-and-difference signal on a line 60. A lowpass filter 62 attenuates all but the frequency difference signal which it outputs on a line 64. A compensator 66 is responsive to the signal on line 64 and produces an average or compensated signal on a line 68. The signal on line 68 is a smoothed waveform which substantially eliminates momentary variations in the difference signal to minimize transient effects due to floating debris or wave action in the fluid body.

A frequency counter 70 then determines the frequency of the compensated signal on line 68 and produces a digital frequency signal on a line 72. This frequency signal is analyzed by an analyzer circuitry 74 which develops a sewage level signal on a line 76. An output device 78, such as a strip or chart recorder, then records the sewage level at various predetermined times.

Figure 7A:
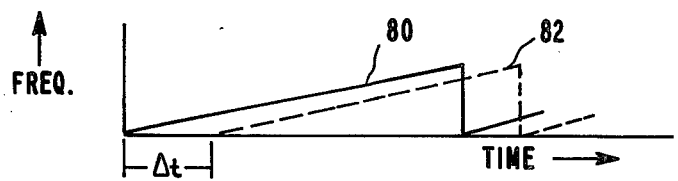
FIGS. 7b and 7c illustrate the waveforms found at the input and output, respectively, of the compensator shown in FIG. 6.
Figure 7B:
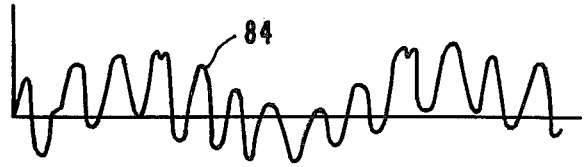
Figure 7C:
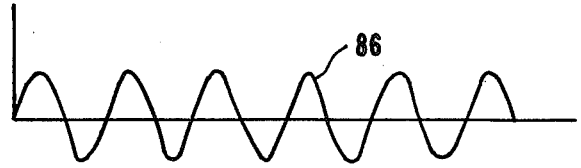

With respect to FIGS. 7a–7c, the operation of the circuit of FIG. 6 can be more fully described. In FIG. 7a, a waveform 80 is shown which represents the frequency/time relationship of the sweep signal found on line 40. Waveform 82 (shown in broken line) similarly indicates the frequency/time relationship of the demodulated signal on line 56. Since it takes a certain amount of time for radiated signal 46 to travel between antenna 28 and the upper surface of fluid body 48 and for reflected signal 50 to travel from the upper surface of fluid body 48 to antenna 30, waveforms 80 and 82 will be shifted relative one another by an amount as indicated by Δt. Thus, the magnitude of the shift Δt will increase with a decrease in fluid level. If the sweep of frequency is linear, as shown, the magnitude of the shift between the two signals in linearly related to fluid level.

In FIG. 7b, a waveform 84 is shown which represents the difference signal found on line 64. The irregularities in frequency and amplitude of the signal are due to reflections from the walls confining the fluid body, by protruding pipes or by wave actions or floating objects in the fluid body itself. Waveform 84 can be compared to waveform 86 of FIG. 7c which illustrates the signal on line 68 having substantially all such irregularites averaged out. The frequency of the signal on line 68 can be relied on to give an accurate determination of fluid body level.

What is claimed is:

1. A fluid level measurement apparatus for mounting in manholes and similar structures comprising:
   support means including,
   a bracket means having a seat portion and a plurality of support arm portions, each support arm having a terminal section positioned above said seat portion, said seat portion defining at least two spaces apart microwave antenna windows,
   clamping means coupled to each of said terminal sections for selectively engaging and disengaging said bracket means from the inner rim of a manhole; and
   microwave depth gauge means at least partially supported by said seat portion for determining fluid level beneath said support means, said microwave depth gauge means having microwave transmitting and receiving antennas spaced to communicate microwave radiation through said windows.

2. An apparatus as recited in claim 1 wherein said seat portion is a framework attached to at least one of said plurality of support arm portions and configured to engage a portion of a first enclosure of said depth gauge means that houses circuitry thereof, and said plurality of support arm portions are joined together at a central hub to form a generally Y-shaped member having said terminal sections bent upwardly out of plane with respect to the remainder of said support arm portions.

3. An apparatus as recited in claim 2 wherein said clamping means includes
   screw means disposed in threaded bores formed through said terminal sections and having ends engageable with said inner rim.

4. An apparatus as recited in claim 2 wherein said depth gauge means includes
   a power source means housed in a second enclosure separate from said first enclosure, said second enclosure being coupled between two support arm portions of said bracket means.

* * * * *

UNITED STATES PATENT AND TRADEMARK OFFICE
CERTIFICATE OF CORRECTION

PATENT NO. : 4,205,315
DATED : May 27, 1980
INVENTOR(S) : Richard P. Fleenor

It is certified that error appears in the above-identified patent and that said Letters Patent are hereby corrected as shown below:

Column 2, line 22   Change "space" to "spaced"

Column 2, line 25   Change "window" to "windows"

Column 2, line 52   Change "FIG. 1a" to "FIG. 7a"

Column 3, line 11   Insert "a" after "is"

Column 4, line 56   Delete "the" after "of"

Column 6, line 7    Change "spaces" to "spaced"

*Signed and Sealed this*

*Twenty-sixth* Day of *August 1980*

[SEAL]

*Attest:*

SIDNEY A. DIAMOND

*Attesting Officer*   *Commissioner of Patents and Trademarks*